Aug. 30, 1932.   S. T. PAYNE   1,874,610
FUSELAGE CONSTRUCTION
Filed Aug. 4, 1930   2 Sheets-Sheet 1

INVENTOR
SAMUEL T. PAYNE
BY
ATTORNEY

Aug. 30, 1932.   S. T. PAYNE   1,874,610
FUSELAGE CONSTRUCTION
Filed Aug. 4, 1930   2 Sheets-Sheet 2
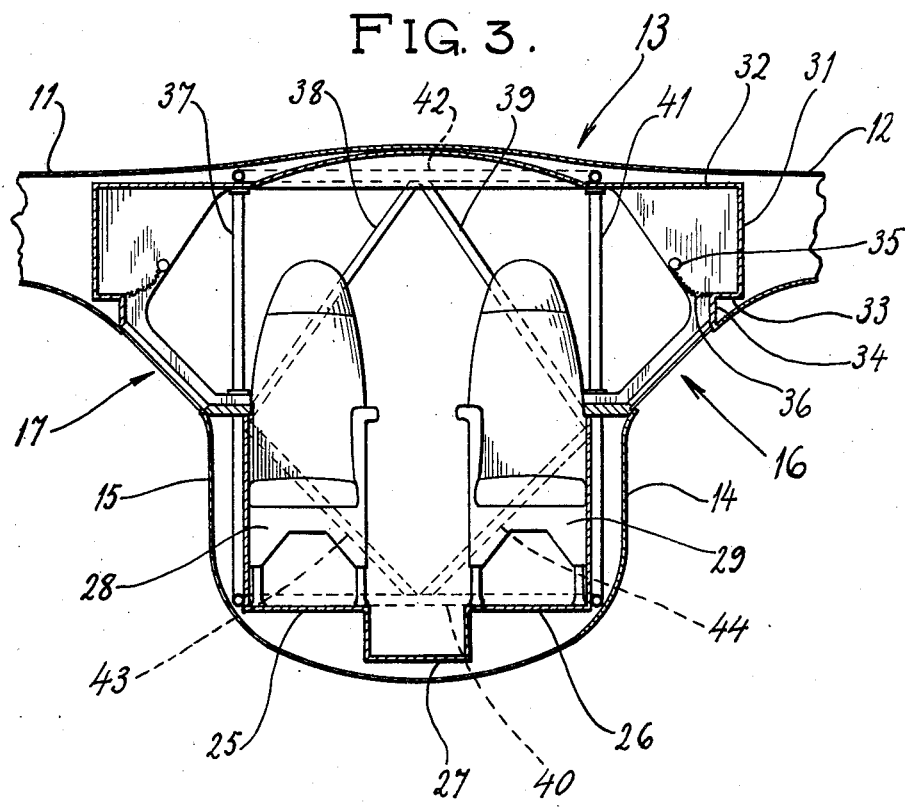

Patented Aug. 30, 1932

1,874,610

UNITED STATES PATENT OFFICE

SAMUEL T. PAYNE, OF FREEPORT, NEW YORK, ASSIGNOR TO CURTISS AEROPLANE & MOTOR COMPANY, INC., A CORPORATION OF NEW YORK

FUSELAGE CONSTRUCTION

Application filed August 4, 1930. Serial No. 472,847.

My invention relates to airplanes and more particularly to an improved design for fuselages therefor.

Prior to my invention, airplanes have usually been constructed with the fuselage formed with substantially vertical side walls and with windows fitted in the side walls by which passengers and operators are enabled to view the earth over which the airplanes are passing. Also airplanes have been constructed with the angle between the wings and the fuselage partly filled in to reduce turbulence. Moreover, airplanes have been proposed, whether actually constructed or not, in which the cabin is to be formed entirely within the wings of the airplane and in which windows by which the passengers may see out are formed in said wings. So far as I am aware, however, there has never been proposed prior to my invention an airplane formed with separate fuselage and wings and having the connection between the lower surfaces of the wings and side walls slanting both interiorly and exteriorly. Neither has there been proposed, so far as I am aware, an airplane formed with separate fuselage and wings in which the windows have been formed in the fillet (i. e. in the portion of the structure which connects the wings with the fuselage). Neither has it hitherto been proposed to use this portion of the structure to increase the elbow room for passengers, nor to use the wings for the baggage of passengers housed in the fuselage.

One of the objects of my invention is an increase of useful space within the fuselage of an airplane.

A further object of my invention is an increase in visibility for the passengers and operators of an airplane.

More specifically, one of the objects of my invention is to provide, for use in an airplane having separate fuselage and wings, a baggage compartment within a part of one of the wings of the airplane.

A further specific object of the invention is the provision of elbow room for passengers within the portion of the structure which connects the wings with the fuselage.

A further object is the provision of a depressed passageway between elevated portions of the fuselage so as to utilize the full depth of the curved shape which has been found to be most efficient in minimizing head resistance of the fuselage.

Further objects of my invention will be apparent from a reading of the subjoined specification and claims and from a consideration of the drawings.

In order to explain the invention more clearly, one embodiment thereof is shown in the accompanying drawings, in which:

Fig. 3 is a vertical sectional view taken through the airplane of Fig. 1 looking backward.

Figure 1:
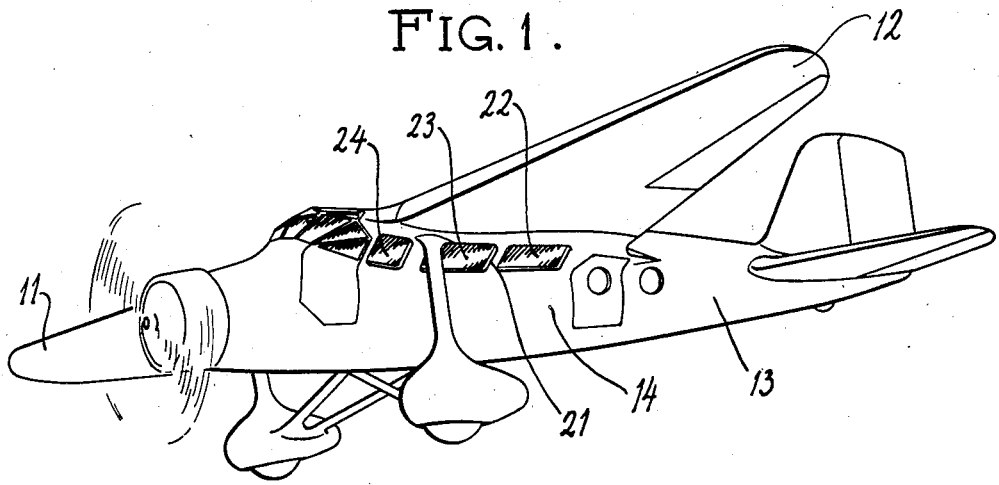
Fig. 1 is a perspective view of a complete airplane constructed according to my invention.

Referring in detail to the drawings in which like numerals are used to refer to the same or similar parts, I have shown an airplane embodying wings 11 and 12 and a fuselage 13. As shown, the airplane is a high wing monoplane and the sides 14 and 15 (Fig. 3) of the fuselage 13 are arranged generally substantially perpendicular to the upper and lower surfaces of the wings 11 and 12, and said sides 14 and 15 are connected to the wings 11 and 12 by fillets 16 and 17. These connections are formed of suitable supports such as 18 and 19 and a suitable outer covering 21 within which are fastened transparent windows such as 22, 23 and 24. The connections are generally of curved outline and serve to reduce the turbulence of the air which would be caused by a sharp corner junction of the wing and fuselage in addition to bracing and adding rigidity to the wing and fuselage. It has been found that even though a greater surface is exposed to the air stream by the addition of the fillet, yet the addition thereof greatly decreases the drag presumably because of the decrease of turbulence. The slanting windows give a much more convenient angle of vision for looking down upon the country over which the airplane is passing. The fillet or slanting connection extends forward beyond the pilot's cockpit and the pilot is thereby also able to obtain increased vision. For instance, both the pilot and the passengers may, by moving the head slightly, obtain vision vertical downward. The pilot has, of course, a full field of vision ahead, and due to windows above, he may also see upward and horizontally to the sides and rearward without movement of his head from its normal position. The passengers do not have horizontal vision when seated upright but when any one of them lies back in his chair in a reclining position, his eyes are lowered to a position in which horizontal vision is obtained.

The floor of the fuselage 13 is formed, as shown more clearly in Fig. 3, of two elevated portions 25 and 26 and a depressed portion 27. The latter forms a passageway by which passengers may move to and from the entrance of the airplane and to and from their respective seats. The elevated portions 25 and 26 support a pair of rows of chairs such as the chairs 28, 29, 30 and 31. Each of these chairs is placed as close as convenient to the adjacent side wall. They may be of usual construction or they may (as shown in Fig. 3) be provided with a single arm on the outside of the chair, but without a corresponding arm on the inside of the chair. In either case the slanting portions 16 and 17 may serve as a space for the elbow of the occupant of the chair, and thus the width of the fuselage may be reduced to a minimum. By the provision of the depressed portion 27 and the elevated portions 25 and 26 the depth of the fuselage may also be reduced to a minimum inasmuch as the passageway above the portion 27 is sufficient for the passenger to walk to and from his seat while the head room above the elevated portions 25 ad 26 is sufficient for him while he is seated in his chair. The provision of the slanting windows such as 22, 23 and 24 gives greater room for the passenger's outer arm as well as allowing a more convenient angle of vision for looking down on the country over which the airplane is passing. The depression of the passageway positions the inner arms of the chairs so that they are convenient for use as a hand rail for passengers passing forward or rearward of the airplane. The door by which the airplane is entered extends upward to include a part of the fillet or slanting connection. Thereby access to the interior of the fuselage is made much more convenient inasmuch as those about to enter may stand upright on the ground outside of the airplane in such a position that their head is under the slanting connection of the fuselage and on stepping up, move into the fuselage without stooping.

Figure 2:
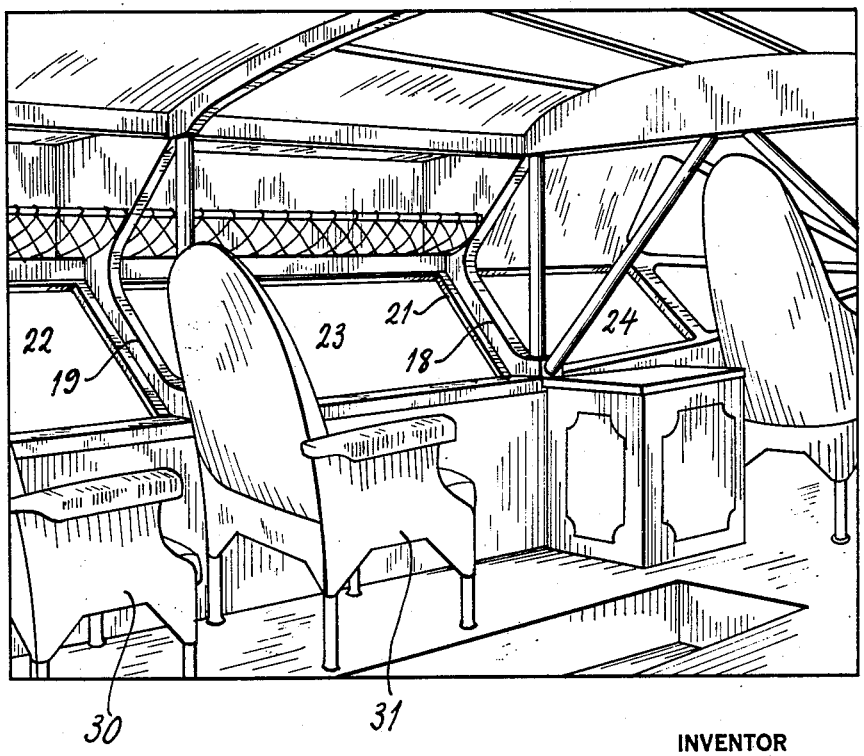
Fig. 2 is a perspective view of the interior of the airplane shown in Fig. 1 looking forward.

Furthermore, I utilize portions of the wings as baggage carrying compartments. As clearly shown in Figs. 2 and 3, the wings 11 and 12 are hollow and the inner portion of each of the wings serves as a space in which the bassage of the passengers may be carried. Preferably, this inner portion of the wing may be separated by walls such as 31, 32, 33 and 34 from the outer hollow portions of the wing. As shown, a rail formed of a tube 35 extends longitudinally of the fuselage, being carried by the supports 18 and 19, and carries suspended therefrom and connected to the partitions 33 and 34 a net 36 for aiding in retaining the baggage within the compartment.

The fuselage 13 may be braced by supports such as the tubes 37, 38, 39, 40, 41, 42, 43 and 44 or if desired it may be of monocoque construction.

In utilizing a fuselage of my improved construction the passengers pass to their respective seats through the passageway above the depressed portion of the floor 27. On reaching said seats the passengers place their baggage in the adjacent compartment partly within the wing of the airplane, step up upon the elevated portion 25 or 26 and seat themselves in a chair similar to one of the chairs 28, 29, 30 and 31. There is obviously sufficient head room for them while seated. Thereafter, the airplane takes flight and the location of the passenger is such that looking outward and downward, a clear view of the country over which the airplane is passing is possible. Notwithstanding the fact that the chair is placed as close as possible to the side wall 14 or 15, the passenger has plenty of elbow room on account of the fact that the slanting portions 16 and 17 extend outward from the side of the chair.

It is to be understood that the above described embodiment of the invention is for the purpose of illustration only and various changes may be made therein without departing from the spirit and scope of the invention.

I claim as my invention:

1. In an airplane, a fuselage having side walls, wings attached to said fuselage and having their surfaces extending substantially perpendicular to the surfaces of said side walls, and an intermediate portion connecting said side walls and the lower surface of the wing, said intermediate portion being arranged both interiorly and exteriorly at a substantial angle to the surface of the side wall and the surfaces of the wing, whereby increased room within the fuselage is obtained for the occupants without increase in head resistance of the airplane, said wings being formed with hollow portions opening into said fuselage for the reception of baggage of the occupants.

2. In an airplane, a fuselage having side walls, wings attached to said fuselage and having their surfaces extending substantially perpendicular to the surfaces of said side walls, an intermediate portion connecting said side walls and the lower surface of the wing, said intermediate portion being arranged both interiorly and exteriorly at a substantial angle to the surfaces of the side wall and the surfaces of the wing, whereby increased room within the fuselage is obtained for the occupants without increase in head resistance of the airplane, said wings being formed with hollow portions opening into said fuselage for the reception of baggage of the occupants, rails extending longitudinally of the fuselage adjacent to said hollow portions of the wings and nets attached to said rails and to the lower part of said openings for the retention of the baggage.

3. In an airplane, a fuselage having side walls, wings attached to said fuselage and having their surfaces extending substantially perpendicular to the surfaces of said side walls, and an intermediate portion connecting said side walls and the lower surface of the wing, said intermediate portion being arranged both interiorly and exteriorly at a substantial angle to the surfaces of the side wall and the surfaces of the wing, the fuselage being formed with a floor having an elevated portion and a depressed portion roughly corresponding to the desired contour of the fuselage, whereby increased useful room within the fuselage is obtained for the occupants and at the same time head resistance of the airplane is decreased.

4. In an airplane, a fuselage, walls for said fuselage, a floor for said fuselage, said floor being formed in a plurality of sections extending longitudinally of the fuselage, one of said sections being positioned adjacent to each side wall and being elevated relative to another section of said floor, and one section being positioned intermediate said elevated sections and being depressed relative thereto, seats for passengers supported upon said elevated portions, whereby a passageway is provided extending along said depressed portion in which passengers may pass to and from said seats and in which sufficient head room is provided for the passengers to walk upright, there being insufficient head room for passengers of normal stature to walk upright over the elevated portions of said floor whereby there is provided a fuselage of the cabin type of adequate interior space but having a minimum amount of head resistance.

5. In an airplane, a fuselage, hollow monoplane wings attached to the upper portion of said fuselage, said fuselage being formed with side walls substantially perpendicular to said wings, connecting portions between the lower surfaces of said wings and said side walls arranged both interiorly and exteriorly at a substantial angle to the surfaces of the wing and the surfaces of the side wall, sections of transparent material secured in said connecting portions, partitions for said hollow wings separating the portion thereof adjacent to the fuselage from the outer portions thereof so that said inner portions communicate directly with the interior of said fuselage, chairs positioned adjacent to said side walls so that the arm of each occupant of one of the chairs may project into the space formed by the slanting sides, and a floor for said fuselage, said floor being formed in longitudinal sections, one section adjacent to each side being elevated relative to another part of the floor, and an intermediate section depressed relative to the sections adjacent the side walls.

6. In an airplane, a fuselage, wings attached to the fuselage, a slanting connection between the wings and fuselage, and a door in the fuselage and extending upwardly into a portion of said slanting connection, whereby passengers may enter the fuselage in an upright position.

7. In an airplane, a fuselage having side walls, chairs positioned within said fuselage close to said side walls and having arms disposed in substantially the same horizontal plane as the upper edges of said side walls, wings attached to said fuselage and having their surfaces extending substantially perpendicular to the surfaces of said walls, and an intermediate portion connected to the upper edge of each side wall and extending upwardly and outwardly therefrom and connected to the inner lower edge of its adjacent wing.

8. In an airplane, a fuselage having side walls, wings attached to said fuselage and having their surfaces extending substantially perpendicular to the surfaces of said walls, an intermediate portion connected to the upper edge of each side wall and extending upwardly and outwardly therefrom and connected to the inner lower edge of its adjacent wing, and chairs positioned within the fuselage close to said side walls and of such a height as to bring the elbows of the occupants of the chairs into the spaces provided by the outwardly extending intermediate portions.

In testimony whereof I hereunto affix my signature.

SAMUEL T. PAYNE.